United States Patent
Grassl et al.

(10) Patent No.: US 11,980,925 B2
(45) Date of Patent: May 14, 2024

(54) DEVICE AND METHOD FOR TURNING METAL SHEETS

(71) Applicant: TRUMPF Maschinen Austria GmbH & Co. KG., Pasching (AT)

(72) Inventors: Rainer Grassl, Pasching (AT); Daniel Kreisbichler, Krenglbach (AT); Martin Kurcz, Niederneukirchen (AT); Maximilian Lang, Linz (AT); Herbert Lehner, Grieskirchen (AT); Albert Mayrhofer, Allhaming (AT); Johannes Reisinger, Haag am Hausruck (AT); Stefan Richter, Leonding (AT); Thomas Weiss, Kirchberg-Thening (AT); Karin Wesely, Leonding (AT)

(73) Assignee: TRUMPF Maschinen Austria Gmbh &Co. KG., Pasching (AT)

( * ) Notice: Subject to any disclaimer, the term of this patent is extended or adjusted under 35 U.S.C. 154(b) by 107 days.

(21) Appl. No.: 17/800,834

(22) PCT Filed: Mar. 2, 2021

(86) PCT No.: PCT/AT2021/060070
§ 371 (c)(1),
(2) Date: Aug. 18, 2022

(87) PCT Pub. No.: WO2021/174274
PCT Pub. Date: Sep. 10, 2021

(65) Prior Publication Data
US 2023/0079162 A1 Mar. 16, 2023

(30) Foreign Application Priority Data
Mar. 3, 2020 (AT) .................................. 50157/2020

(51) Int. Cl.
*B21D 43/14* (2006.01)
*B65G 47/248* (2006.01)
(Continued)

(52) U.S. Cl.
CPC ......... *B21D 43/145* (2013.01); *B65G 47/248* (2013.01); *B65H 5/10* (2013.01);
(Continued)

(58) Field of Classification Search
CPC .. B21D 43/145; B65G 47/248; B65G 47/252; B65H 5/10; B65H 5/222; B65H 15/00; B65H 2406/341; B65H 2701/173
(Continued)

(56) References Cited

U.S. PATENT DOCUMENTS 2,501,224 A * 3/1950 Kadell ................. B65G 47/252
198/404
3,589,532 A * 6/1971 Filkins ................. B65G 47/252
414/759
(Continued)

FOREIGN PATENT DOCUMENTS

CN 107915029 A 4/2018
CN 109264393 A 1/2019
(Continued)

OTHER PUBLICATIONS

International Search Report in PCT/AT2021/060070, dated Jun. 23, 2021.

*Primary Examiner* — Mark A Deuble
(74) *Attorney, Agent, or Firm* — Collard & Roe, P.C.

(57) ABSTRACT

A sheet metal processing plant includes a conveyor defining a receiving surface for a workpiece and a conveying direction in a conveying plane and being embodied for conveying the workpiece, the workpiece having a bottom side and a top side, and a turning unit embodied for turning the workpiece
(Continued)

received on the receiving surface from the bottom side to the top side. The turning unit includes a manipulator embodied to lift the bottom side of the workpiece off the receiving surface, to perform a turning operation of the workpiece and to place the top side of the workpiece on the receiving surface of the conveyor.

15 Claims, 7 Drawing Sheets

(51) Int. Cl.
    *B65H 5/10*     (2006.01)
    *B65H 5/22*     (2006.01)
    *B65H 15/00*     (2006.01)

(52) U.S. Cl.
    CPC .............. *B65H 5/222* (2013.01); *B65H 15/00* (2013.01); *B65H 2406/341* (2013.01); *B65H 2701/173* (2013.01)

(58) Field of Classification Search
    USPC .................................................. 198/411–412
    See application file for complete search history.

(56) References Cited

U.S. PATENT DOCUMENTS

| | | | | |
|---|---|---|---|---|
| 3,780,882 | A * | 12/1973 | Wagner | ................... F15B 15/02 414/759 |
| 3,973,673 | A * | 8/1976 | Ahluwalia | ............ B65G 49/067 198/374 |
| 4,125,072 | A | 11/1978 | Maier et al. | |
| 4,770,596 | A | 9/1988 | Sartorio | |
| 4,890,717 | A * | 1/1990 | Kane | ..................... B65G 47/252 414/759 |
| 4,969,552 | A * | 11/1990 | Kennicutt | ............ B65G 47/252 198/399 |
| 8,439,625 | B2 * | 5/2013 | Pass | ........................ B21B 39/32 414/771 |
| 10,173,847 | B2 * | 1/2019 | Pass | ........................ B21B 39/32 |
| 11,584,593 | B1 * | 2/2023 | Battles | .................... B65G 29/00 |
| 11,584,605 | B2 * | 2/2023 | Ackermann | ......... B25J 15/0061 |
| 2014/0308535 | A1 | 10/2014 | Yakushidou et al. | |
| 2018/0201451 | A1 | 7/2018 | Moore et al. | |

FOREIGN PATENT DOCUMENTS

| | | |
|---|---|---|
| CN | 110170589 A | 8/2019 |
| CN | 110654832 A | 1/2020 |
| CN | 111421068 A | 7/2020 |
| DE | 2544203 A1 | 4/1977 |
| DE | 3622923 A1 | 1/1987 |
| DE | 102004057105 B3 | 6/2006 |
| JP | S55-128334 A1 | 10/1980 |
| JP | S63-157436 U | 10/1988 |
| JP | 5935697 B2 | 6/2016 |
| KR | 101605265 B1 | 3/2016 |
| WO | 2020/187481 A1 | 9/2020 |

* cited by examiner

DEVICE AND METHOD FOR TURNING METAL SHEETS

CROSS REFERENCE TO RELATED APPLICATIONS

This application is the National Stage of PCT/AT2021/060070 filed on Mar. 2, 2021, which claims priority under 35 U.S.C. § 119 of Austrian Application No. A 50157/2020 filed on Mar. 3, 2020, the disclosure of which is incorporated by reference. The international application under PCT article 21(2) was not published in English.

The invention relates to a sheet metal processing plant having a conveying means for conveying a workpiece and a turning unit for turning a workpiece, as well as to a method for turning metal sheets for a sheet metal processing plant.

Turning devices for turning workpieces are, in general, known. DE102004057105 B3 describes a turning device for turning workpieces between processing stations, in particular for press stations. Two workpiece carriers are suggested therein, which are coupled to a drive device and each have a holding surface. With the aid of the drive device, the workpiece carriers can be pivoted from an initial position to a transfer position in order to pivot the workpiece from one workpiece carrier to the other. Furthermore, a transfer device is embodied which carries out the deposit or pick-up of the workpieces on and/or from the turning device.

The device known from DE102004057105 B3 has the disadvantage that a separate manipulator must be provided to convey the workpiece from a press station to the turning unit and is also moved between the workpiece carriers during turning.

Furthermore, in the prior art, metal sheets are also turned at great expense with the aid of additional conveyors and multi-axis robots.

CN107915029 A discloses a turning unit, wherein the turning unit comprises a manipulator, which manipulator is embodied to lift the bottom side of the workpiece from the receiving surface, to perform a turning operation of the workpiece and to deposit the top side of the workpiece onto the receiving surface of the conveying means, wherein for turning the complete turning unit is rotated by 180°.

Moreover, it is known that in conveying devices of a sheet metal processing plant, the conveying means is embodied so as to be rotatable about the conveying direction, which can, however, lead to incorrect workpiece alignment and damage.

The object of the present invention was to overcome the shortcomings of the prior art and to provide an improved device and/or an improved method for turning metal sheets, in which a turning operation can be performed by simple means and a small space requirement.

This object is achieved by means of a device and a method according to the claims.

According to the invention, a sheet metal processing plant with a turning unit is formed. The sheet metal processing plant comprises:
- a conveying means, said conveying means defining a receiving surface for a workpiece and a conveying direction in a conveying plane, and which is embodied for conveying a workpiece, said workpiece having a bottom side and a top side;
- a turning unit, said turning unit being embodied for turning the workpiece received on the receiving surface from the bottom side to the top side, wherein it is further provided that the turning unit comprises a manipulator, said manipulator being embodied to lift the bottom side of the workpiece off the receiving surface, to carry out a turning operation of the workpiece and to place the top side of the workpiece on the receiving surface of the conveying means.

This embodiment according to the invention entails the advantage that a workpiece is turned precisely, gently, in a space-saving manner and, above all, in a short time on the conveying means by simple means, in order to then feed the workpiece back into a process of the sheet metal processing plant, thus enabling short cycle times.

An additional advantage consists in that due to the simple embodiment of the turning unit, operational costs can be saved.

Furthermore, due to the embodiment of the turning unit according to the invention, its danger area is embodied as small as possible, which ensures a higher safety factor.

For the sake of completeness, it should be mentioned here that the mentioned top and bottom sides are the surfaces of the metal sheet currently received on the conveying means with regard to a subsequent turning process and that these are turned again from a bottom side to a top side of the workpiece during a new turning process.

Furthermore, it can be provided that at least parts of the conveying means are embodied to be displaceable such that in the conveying plane, an access opening for the manipulator can be formed. By this measure, regions or additional devices of the turning unit or a storage can be made accessible for the manipulator in a space-saving manner and quickly.

According to an advancement, the manipulator can comprise a gripping device, said gripping device being embodied to grip the workpiece on a top side with a gripping surface. Gripping on the top side has the advantage that required gripping force can be optimally distributed over the workpiece to avoid damage and similar undesirable effects.

Moreover, it can be advantageous for a part of the manipulator or a gripping device to be embodied so as to be displaceable or telescopable along an axis. This allows for an additionally improved adaptability to the workpiece geometry. Moreover, this measure can make depositing or picking up of the workpiece more process-safe.

It can be advantageous for the manipulator to comprise a gripping device which is embodied to grip the workpiece on the edges of two opposite workpiece ends. By this measure, the gripping device can be adapted to different workpiece dimensions particularly easily.

For ease of understanding, it should be mentioned in this regard that the term "on the edges" means a flat area in the circumferential edge area of the workpiece which is formed on the top or bottom side of the workpiece and can be aligned e.g. parallel with respect to the conveying direction or orthogonal with respect to the conveying direction, depending on the orientation of the manipulator.

Furthermore, it can be provided that the gripping device comprises at least one turning head, said turning head being embodied to be pivotable at least by 180°. Hence, pivoting of the gripping device with the workpiece can be achieved, whereby a quick turning operation can be performed in a minimum space.

It can be particularly advantageous for the gripping device to comprise a first gripping section and a second gripping section for each of the two opposite workpiece ends, wherein the first gripping section and the second gripping section are embodied so as to be separately pivotable about a common rotation axis. By this embodiment, a turning operation is particularly process-safe and, in addition, simple lifting and depositing of the workpiece is made possible without having to move the manipulator or parts of it separately.

It can be advantageous if the manipulator is embodied being pivotable about a pivot axis, said pivot axis being arranged in parallel with respect to the conveying direction. Hence, lifting, turning as well as depositing of the workpiece can be done around one single axis.

Furthermore, it can be advantageous if the manipulator is embodied being pivotable about an axis, said axis being arranged in parallel with respect to the conveying plane and orthogonally with respect to the conveying direction. This, on the one hand, entails the advantage that lifting, turning and depositing about an axis is enabled, but also that the component can be turned about an axis orthogonally with respect to the conveying direction if required.

Moreover, it can be provided that the turning unit has a tray arranged parallel with respect to the conveying plane of the conveying means, which tray can be moved between a first operating position and a second operating position. By this embodiment, the workpiece can be temporarily stored during the turning operation, which can be particularly advantageous in case of a simple embodiment of the manipulator, i.e. with one single pivot axis.

Further, is provided that the manipulator comprises a first gripping device and a second gripping device embodied to transfer the workpiece from the first gripping device to the second gripping device during the turning operation. By means of this embodiment, it is possible to turn the workpiece in a simple and process-safe manner, in that the workpiece can be flatly gripped by the first or second gripping devices on the top and/or bottom surface.

Moreover, a method for turning metal sheets for a sheet metal processing plant is provided, comprising the following steps:

providing a sheet metal processing plant, providing a conveying means, said conveying means defining a receiving surface for a workpiece and a conveying direction in a conveying plane and being embodied for conveying a workpiece, said workpiece having a bottom side and a top side, providing a workpiece on the receiving surface of the conveying means, providing a turning unit, said turning unit being embodied to turn the workpiece received on the receiving surface from the bottom side to the top side, wherein the turning unit comprises a manipulator which lifts the bottom side of the workpiece off the receiving surface, carries out a turning operation of the workpiece and places the top side of the workpiece on the receiving surface of the conveying means.

By the method according to the invention, it is possible to quickly and easily turn metal sheets, which are placed on a conveying means in a sheet metal processing plant, to thus allow short cycle times and save construction space.

Moreover, it can be advantageous if at least one storage is provided which is positioned below the conveying plane of the conveying means. This entails the advantage that metal sheets can also be placed or temporarily stored by the turning unit after the processing operations, or can also be picked up there for the first time before the processes. In other cases, damaged or defective workpieces can also be stored there. Furthermore, the storage can also form a warehouse for parts of the manipulator and/or the turning unit.

Moreover, it can be provided that in the conveying means, an access opening for the manipulator is formed in the conveying plane, and, in this regard, at least parts of the conveying means are displaced. By this measure, regions or additional devices of the turning unit or a storage can be made accessible for the manipulator in a space-saving and quick manner.

Furthermore, it can be advantageous if providing the workpiece is carried out by means of the manipulator, wherein the workpiece is lifted off the storage and is placed on the receiving surface of the conveying means by means of the manipulator. This entails the advantage that an additional conveying device, which initially feeds the metal sheets to the sheet metal processing plant, can be dispensed with.

It can also be advantageous for the manipulator to comprise a gripping device with a gripping surface and for the workpiece to be gripped on the top side with the gripping surface. Gripping on the top side has the advantage that required gripping force can be optimally distributed over the workpiece to avoid damage and similar undesirable effects.

Moreover, it can be provided that the manipulator comprises a gripping device, and the workpiece is gripped on the edges of two opposite workpiece ends by the gripping device. By this measure, it can be achieved that different geometries of workpieces can be gripped as easily as possible with the same gripping device.

Moreover, it can be advantageous if the gripping device comprises at least one turning head, which is embodied to be pivotable by at least 180° and if the gripping device is turned at least partially about a turning axis with the workpiece in the turning operation. By this measure, a quicker turning operation can be performed in a minimum space.

It can be advantageous for the gripping device to comprise a first gripping section and a second gripping section for each of the two opposite workpiece ends, wherein the first gripping section and the second gripping section are embodied so as to be individually pivotable about a common rotation axis, comprising the following steps:

gripping the top side of the workpiece by means of the first gripping section of the gripping device, lifting the bottom side of the workpiece off the receiving surface of the conveying means by means of the first gripping section, pivoting the second gripping section about the rotation axis in the direction towards the bottom side of the workpiece and gripping the bottom side by means of the second gripping section, carrying out the turning operation, pivoting the first gripping section about the rotation axis away from the top side of the workpiece, placing the workpiece with its top side on the receiving surface of the conveying means by means of the second gripping section.

By this embodiment, the turning operation is particularly process-safe and, in addition, simple lifting and depositing of the workpiece is made possible without having to move the manipulator or parts of it separately.

According to an advancement, it is possible that the manipulator further comprises means by which a holding force of the gripping device is at least reduced during the turning operation and that when the holding force is reduced, the workpiece slides off the gripping device when it is placed on the receiving surface of the conveying means. Thereby, the workpiece can already slide into the direction of the receiving surface while the turning operation takes place. This can result in additional saving of time.

In case of a suction or vacuum gripper, these means can comprise, for example, a compressed air control and/or a vacuum control, and in case of a magnetic gripper, a control of the magnetic field and/or also pneumatic in case of a permanent magnet. Alternatively, the holding force can also be deactivated, which would allow for a simplified control.

Moreover, it can be provided that a tray is provided, said tray being arranged in parallel with respect to the conveying plane of the conveying means, that the tray is displaced into a first operating position and a second operating position and the workpiece is deposited by the gripping device during the turning operation in the first operating position and is picked up again in the second operating position. By this embodiment, the workpiece can be temporarily stored during the turning operation, which can be particularly advantageous in case of a simple embodiment of the manipulator, i.e. with one single pivot axis.

Furthermore, it is provided that the manipulator comprises a first gripping device and a second gripping device, wherein by means of the first gripping device, the bottom side of the workpiece is lifted off the receiving surface and a first partial step of the turning operation is performed, the workpiece is transferred from the first gripping device to the second gripping device and received by it, a second partial step of the turning operation is performed and the top side of the workpiece is placed on the receiving surface of the conveying means by means of the second gripping device. By means of this embodiment, it is possible to turn the workpiece in a simple and process-safe manner, in that the workpiece, for example, can be flatly gripped by the first or second grip-ping devices on the top and/or bottom surface.

Moreover, it can be advantageous for parts of the manipulator or the gripping device to be embodied so as to be displaceable with respect to one another along an axis. This allows for an additionally improved adaptability to the workpiece geometry. Moreover, this measure can make depositing or picking up of the workpiece more process-safe.

The gripping devices can comprise grippers known from the prior art, such as magnetic grippers or suction and/or vacuum grippers.

Furthermore, it can also be provided that the gripping devices comprise pincer grippers which can be advantageous for gripping on the workpiece ends.

The sheet metal processing plant can comprise different plants known from the prior art, such as a punching machine, a bending press, a laser processing machine and others.

For the purpose of better understanding of the invention, it will be elucidated in more detail by means of the figures below.

These show in a respectively very simplified schematic representation.

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

The term "in particular" shall henceforth be understood to mean that it may refer to a possible more specific formation or more detailed specification of an object or a process step, but need not necessarily depict a mandatory, preferred embodiment of same or a mandatory practice.

Figure 1:
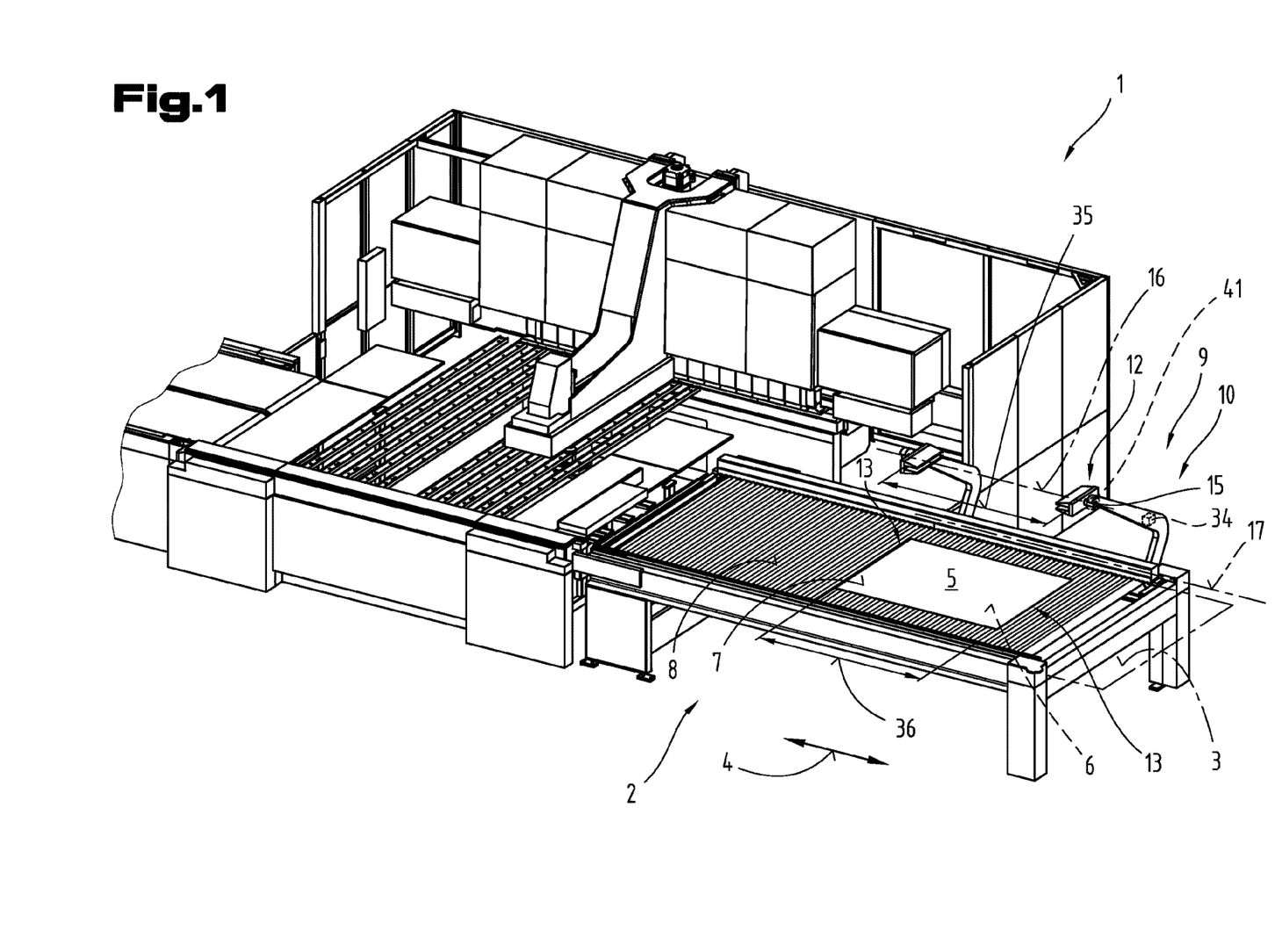
FIG. 1 an embodiment of a sheet metal processing plant with a conveying means and a turning unit in an oblique view.

FIG. 1 shows an embodiment of a sheet metal processing plant 1 with a conveying means 2 and a turning unit 9 in an oblique view. The conveying means 2 defines a conveying plane 3 and a conveying direction 4, along which a workpiece 5 can be conveyed away from and/or to a process of the sheet metal processing plant 1. The workpiece 5 has a top side 7 and a bottom side 6. The workpiece 5 rests on the receiving surface 8 of the conveying means 2 with the bottom side 6. According to the invention, the turning unit 9 comprises a manipulator 10 which is embodied to lift the bottom side 6 of the workpiece 5 off the receiving surface 8, to perform a turning operation of the workpiece 5 and to place the top side 7 of the workpiece 5 on the receiving surface 8 of the conveying means 2.

The embodiment of the manipulator 10 of the turning unit 9 in FIG. 1 shows a possible embodiment variant of the manipulator 10 with a gripping device 12 which grips the workpiece 5 on the edges of two opposite workpiece ends 13. The manipulator 10 is embodied so as to be pivotable about an axis 17. The gripping device 12 comprises a turning head 15, which is pivotable by at least 180° about a turning axis 16 by means of a turning drive 41. The gripping device 12 can further comprise means 34, as indicated in dashed lines, which can reduce and/or deactivate a holding force of the gripping device 12 during the turning operation, to let the workpiece 5 slide off the gripping device 12 when placing it on the receiving surface 8 of the conveying means 2. For this embodiment, the manipulator 10 may be telescopic, or it may be movable in a plane parallel with respect to the conveying plane 3 to allow sliding onto the receiving surface 8.

However, sliding onto the receiving surface 8 can also take place in that the gripping device 12 is slowly opened in the direction towards the receiving surface 8, if, for example, a pincer gripper is used.

However, the manipulator 10 and/or the gripping device 12 shown in FIG. 1 can also be embodied such that they have parts that are displaceable or telescopable along the conveying direction 4, such that a distance 35 of the gripping device 12 for receiving a workpiece 5 can be adapted to different lengths 36 of different workpieces 5. Moreover, changing the distance 35 can enable sliding of the workpiece 5 off the gripping device 12.

The sheet metal processing plant can comprise different plants known from the prior art, such as a punching machine, a bending press or a laser processing machine and others.

Figure 2:
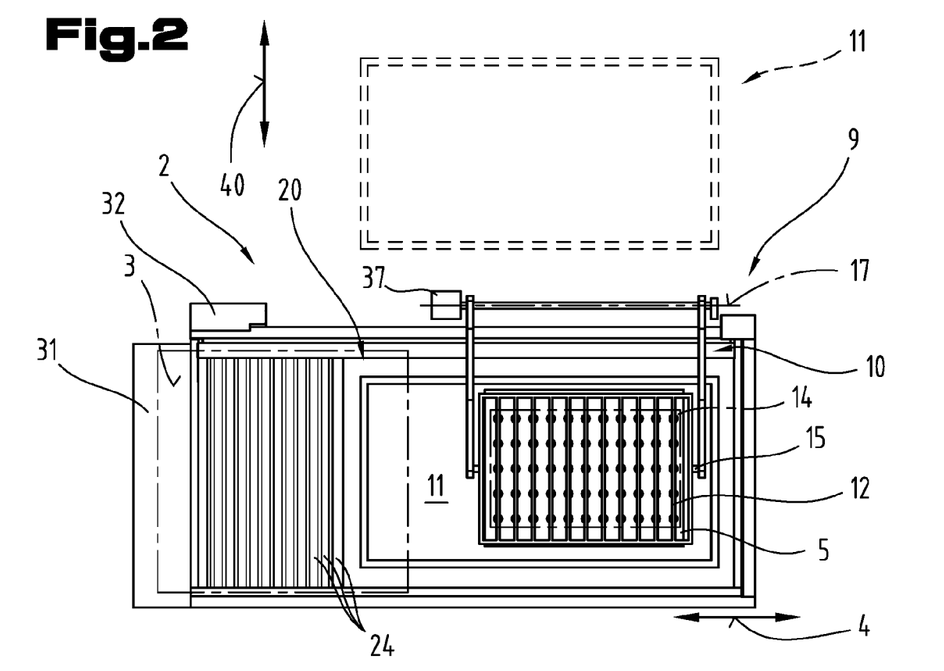
FIG. 2 a depiction of the conveying means in an embodiment variant of a turning unit in a top view.

FIG. 2 shows a possible embodiment of the conveying means 2 with an embodiment variant of a turning unit 9 in a top view. The manipulator 10 is embodied so as to be pivotable about a pivot axis 17 and comprises a gripping device 12 with a gripping surface 14 and a turning head 15.

In this regard, at least parts of the conveying means 2 are embodied so as to be displaceable, such that an access opening 20 for the manipulator 10 can be formed in the conveying plane 3. The conveying means 2 can, for example, comprise individual conveying elements 24, which are embodied so as to be displaceable by a conveying drive 32, and can, for example, be displaced into a conveying means storage 31 to form the access opening 20.

Below this access opening 20, a storage 11 is formed which can, for example, receive or provide a workpiece 5. In other cases, the storage 11 can also serve for receiving a gripping device 12, so as to, for example, be able to change the gripping device 12 for different geometries of the workpiece 5, if it is embodied so as to be couplable to the manipulator 10. A storage 11 can also be arranged next to the conveying means 2, as is indicated in dashed lines in FIG. 2. Furthermore, the storage 11 can also embodied so as to be displaceable. By means of the storage, a workpiece 5 can, for example, also be initially received by the manipulator 10 and be fed to a process of the sheet metal processing plant 1 via the conveying means 2. In this regard, it should be noted that the storage 11 is embodied independently of the embodiment of the conveying means and the turning unit and can also be applied to the following figures.

Furthermore, a drive device 37 is shown, which can comprise a pivot drive for the manipulator 10. Moreover, the drive device 37 can comprise means for displacing the manipulator 10 along a horizontal direction 40 or the conveying direction 4.

Figure 3:
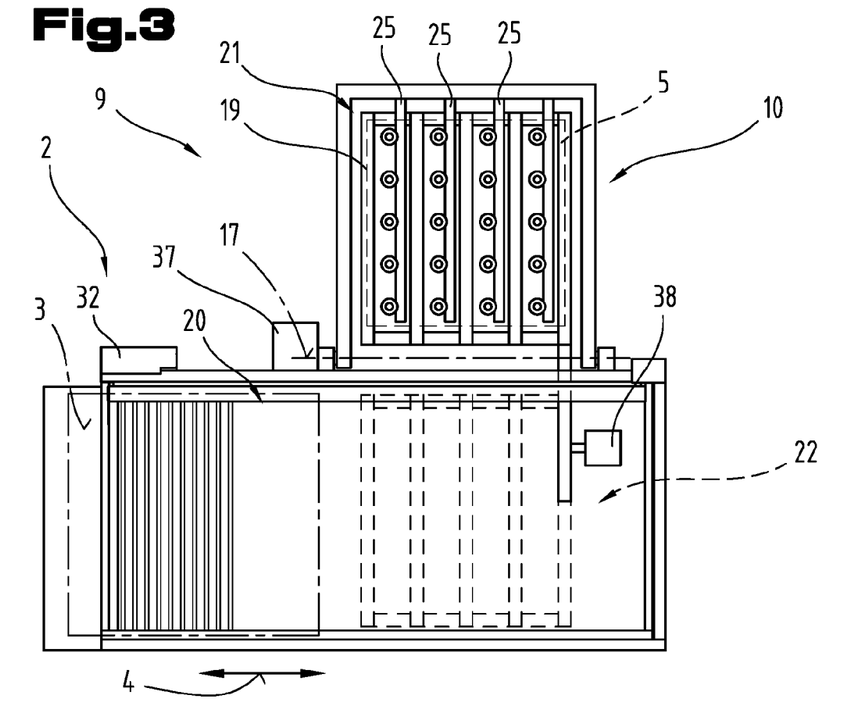
FIG. 3 a further embodiment of a turning unit in a top view.

FIG. 3 shows a possible embodiment of a turning unit 9 with a manipulator 10 in a top view, which is pivotable about a pivot axis 17, which is parallel with respect to the conveying direction 4, with the aid of a drive device 37. Furthermore, the turning unit 9 comprises a tray 19 which is arranged parallel with respect to the conveying plane 3 of the conveying means 2 and which can be displaced between a first operating position 21 and a second operating position 22. The purpose of this embodiment is that the manipulator 10 places the workpiece 5 on the tray 19 in the first operating position 21 during the turning operation and can pick it up again in the second operating position 22.

Displacing between the operating positions can, for example, be performed by means of an actuating drive 38, as is shown in FIG. 3.

In the embodiment variant shown, the tray 19 can linearly move into the mentioned operating positions 21, 22. However, alternatively, it would also be possible to embody it such that it can be moved in an arc, for example, in order to rotate the workpiece 5 by an angle, e.g. by 180°, in addition to the turning operation in a plane parallel to the conveying plane 3.

In this embodiment variant, the manipulator 10 has individual gripping arms 25 which are pivotable about the pivot axis 17 together. Alternatively, the gripping arms 25 can also be pivotable about the axis 17 separately.

In this regard, it should be noted that the tray 19 and the manipulator 10 have to be embodied such that they do not block each other during turning of the workpiece 5 and displacement into the operating positions 21, 22.

Figure 4A:
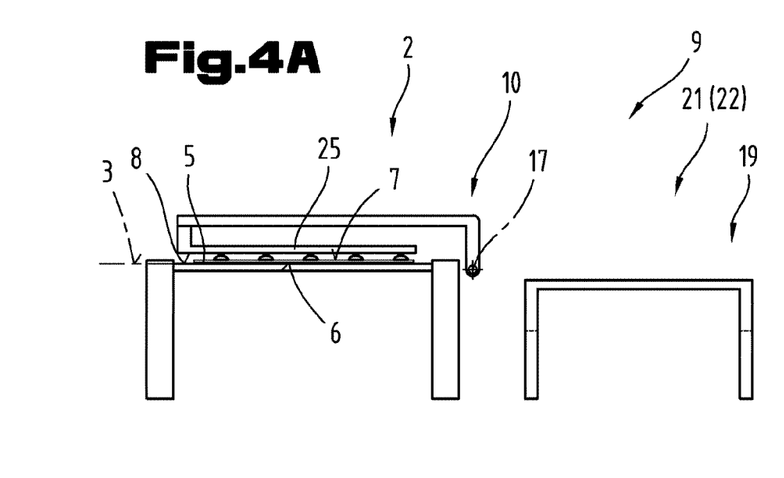
FIG. 4A to D the embodiments of a turning unit according to FIG. 3 in a simplified view, in a lateral view.
Figure 4B:
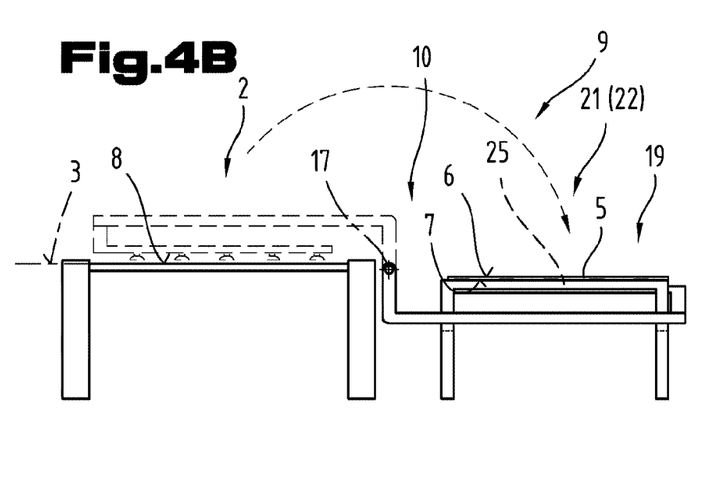
Figure 4C:
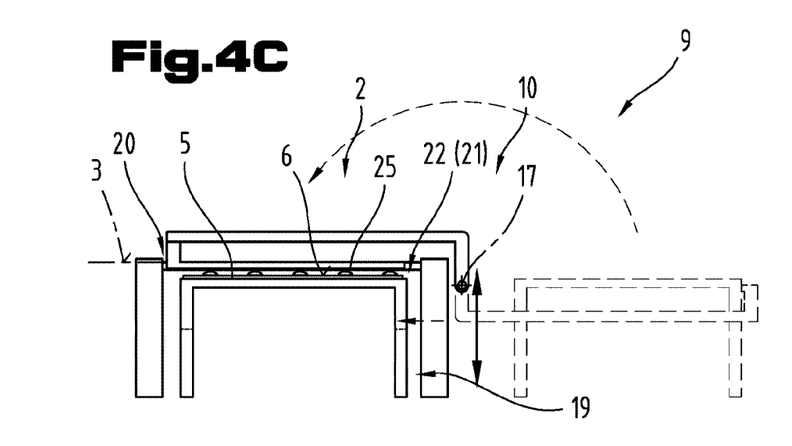

FIGS. 4A to 4D show the embodiment of the turning unit 9 according to FIG. 3 in a simplified representation in a lateral view, as well as a turning operation. In FIG. 4A, the tray 19 is in the first operating position 21, while the manipulator 10 lifts the bottom side 6 of the workpiece 5 off the receiving surface 8 of the conveying means 2 by means of the gripping arms 25. The manipulator 10 pivots the workpiece 5 onto the tray 19 with the top side 7 via the pivot axis 17 in FIG. 4B and remains thereunder. Meanwhile, the access opening 20 is formed in the conveying means 2. According to FIG. 4C, the tray 19 moves into the second operating position 22, the manipulator 10 pivots back via the axis 17, grips the workpiece 5 on its bottom side 6 through the access opening 20 and lifts it off the tray 19.

Figure 4D:
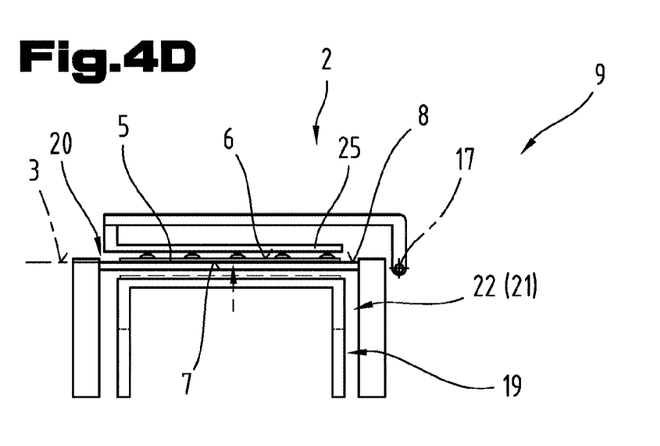

Subsequently, the manipulator conveys the workpiece 5 through the access opening 20 via the conveying plane 3 of the conveying means 2 and places the workpiece 5 on the receiving surface 8 of the conveying means 2 again with its top side 7 as is shown in FIG. 4D. In this regard, it should be noted that at least parts of the conveying means 2 are again accordingly moved such that the access opening 20 is closed again to be able to receive the workpiece 5.

Alternatively, of course, the presently described order can also be reversed, as is indicated by the reference numbers in parentheses, such that the tray 19 is located below the access opening 20 in its first operating position 21, the manipulator lifts the workpiece 5 off the receiving surface 8 with its bottom side 6, places it on the tray 19 through the access opening 20, pivots it about the pivot axis 17, the tray 19 is displaced into its second operating position 22 and the manipulator 10 grips the workpiece 5 on its bottom side 6, pivots it via the pivot axis 17 and subsequently places it on the receiving surface 8 of the conveying means 2 with its top side 7. In an embodiment not shown, it is also possible to arrange the tray above the conveying plane of the conveying means using a suspension or the like, which would eliminate the need for an access opening.

To compensate for a potential height difference between the tray 19 and the conveying plane 3 and a resulting inclination of the gripping arms 25 of the manipulator 10, the manipulator 10 or the tray 19 and/or parts thereof can be embodied so as to be height adjustable. In other cases, a distance of the pivot axis 17 of the manipulator 10 to the conveying means can be embodied being accordingly large, such that the inclination angle of the gripping arms 25 with respect to the tray 19 is as small as possible.

Figure 5:
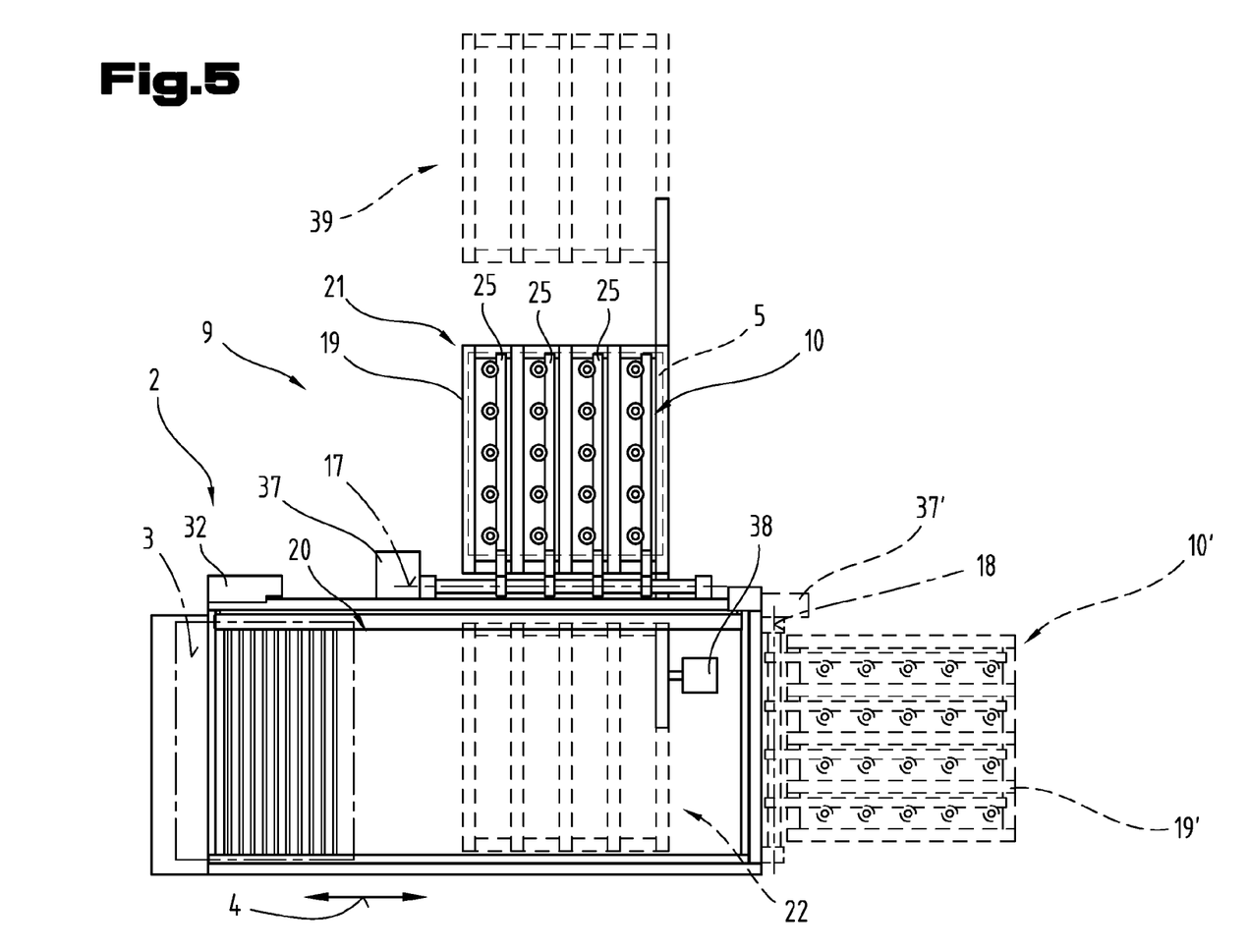
FIG. 5 a further possible exemplary embodiment of the turning unit in a top view.
Figure 6A:
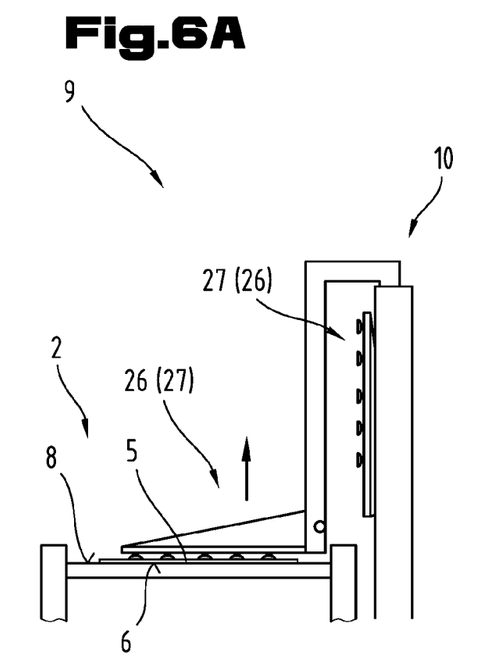
FIG. 6A to D a further embodiment of a turning unit in a lateral view.
Figure 6B:
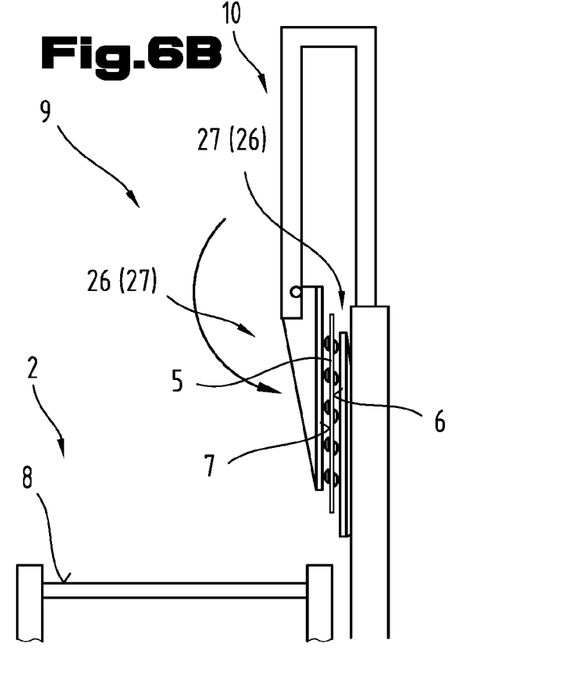
Figure 6C:
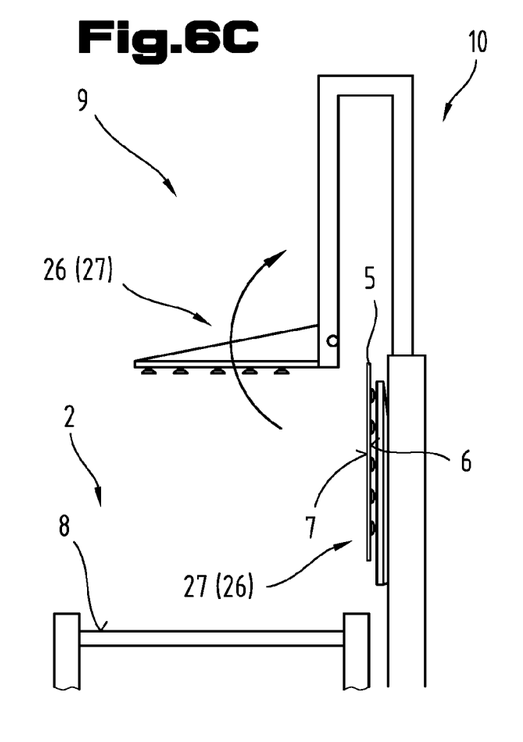
Figure 6D:
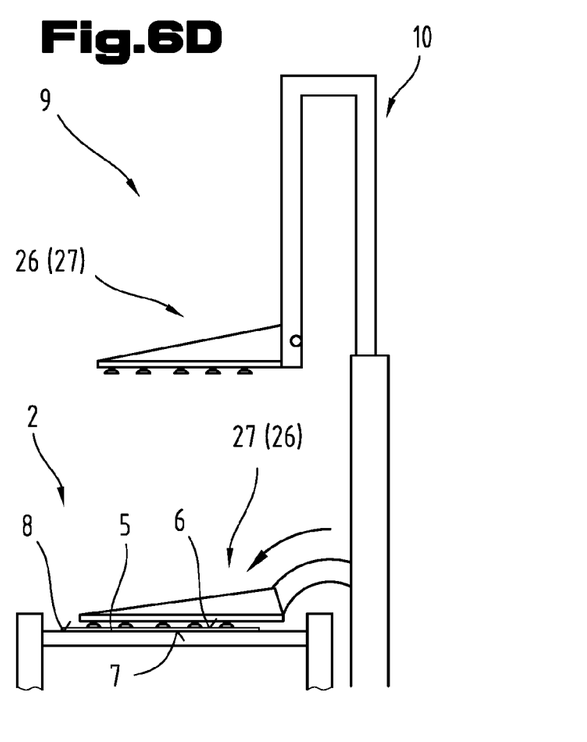

FIG. 5 shows another embodiment of the turning unit 9 and the manipulator 10 in a top view. In this regard, the tray 19 can also comprise an intermediate position 39, such that it can be displaced out of the pivot radius of the manipulator 10 when it is pivoted between the operating positions 21, 22 in order to avoid a collision.

Furthermore, an axis 18 is indicated in FIG. 5 which is arranged orthogonally with respect to the conveying direction 4 and parallel with respect to the conveying plane 3. Alternatively, the manipulator 10' and the tray 19' can be arranged such that the manipulator 10' pivots the workpiece 5 about this axis 18 in the turning operation, as is indicated in dashed lines. Furthermore, the tray 19' can also be displaceable non-linearly, but e.g. in a radius.

FIG. 5 shows a further and possibly independent embodiment of the turning unit 9, wherein again, equal reference numbers and/or component designations are used for equal parts as in FIGS. 3 and 4A to 4D above. In order to avoid unnecessary repetitions, it is pointed to/reference is made to the detailed description of the preceding figures.

Independently of the embodiment of the turning unit 9 in FIG. 5, other embodiments of a manipulator 10 can also be embodied so as to be pivotable about an axis 18 arranged orthogonally to the conveying direction 4 and parallel with respect to the conveying plane 3.

FIGS. 6A to 6D show a further embodiment of a turning unit 9 in a lateral view in a simplified representation, wherein the manipulator 10 comprises a first gripping device 26 and a second gripping device 27. The first gripping device 26 is embodied to lift the bottom side 6 of the workpiece 5 off the receiving surface 8 of the conveying means 2, to perform a first partial step of the turning operation, to transfer the workpiece 5 to the second gripping device 27, which takes over the workpiece 5 from the first gripping device 26, grips it on the bottom side 6, performs a second partial step of the turning operation and places the workpiece 5 on the receiving surface 8 of the conveying means 2 by means of its top side 7. The partial steps of the turning operation described here can, for example, each comprise a pivot angle of 90° as shown, but also two different pivot angles which complement each other to form a supplementary angle. Hence, for example, the first pivot angle can be 135° and the second pivot angle can be 45°.

In this regard, it should be noted for the sake of completeness that a holding force of the first gripping device is deactivated during transfer to the second gripping device as soon as the workpiece was transferred and the first gripping device must be displaced and/or pivoted such that the pivot area of the second gripping device is not blocked.

In this embodiment, it would also be possible to reverse the functions of the two gripping devices 26, 27 as is indicated by the reference number in parentheses.

Furthermore, it is possible that the two gripping devices are embodied differently, such that one gripping device grips the workpiece on a top and bottom side and the other gripping device, for example, grips the workpiece on the edges.

FIGS. 7A to 7D show an embodiment variant of a turning unit 9 in a lateral view, wherein the manipulator 10 comprises a gripping device 12 which is embodied to grip the workpiece 5 on the top side 7 with a gripping surface 14. Furthermore, the manipulator 10 comprises means 34 which can reduce or deactivate the holding force 23 of the gripping device 12 in the turning operation. The mentioned means 34 can meet different technical requirements depending on the embodiment of the gripping device 12. In case of a suction or vacuum gripper, these means can comprise, for example, a compressed air control and/or a vacuum control, and in case of a magnetic gripper, a control of the magnetic field and/or in case of a permanent magnet being used also pneumatic, as mentioned above.

Furthermore, the gripping device 12 comprises a turning head 15 which is embodied so as to be pivotable by at least 180°. Furthermore, a turning drive 41 is indicated in dashed lines, by means of which the turning head 15 is pivoted into the required angular position.

Figure 7A:
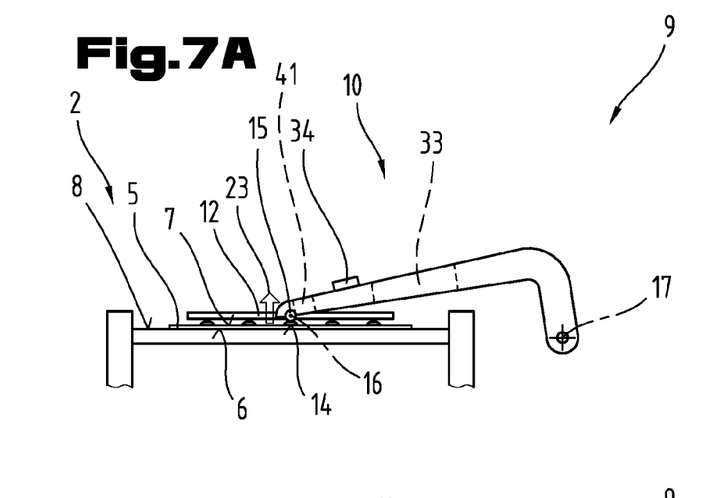
FIG. 7A to D a further possible embodiment variant of a turning unit in a lateral view.
Figure 7B:
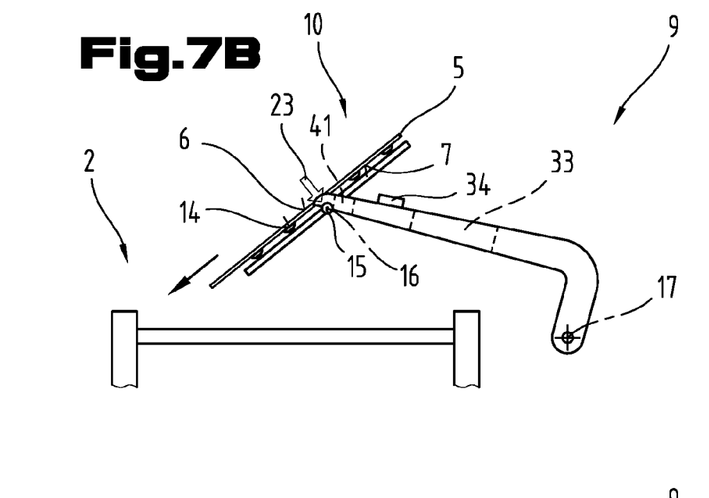
Figure 7C:
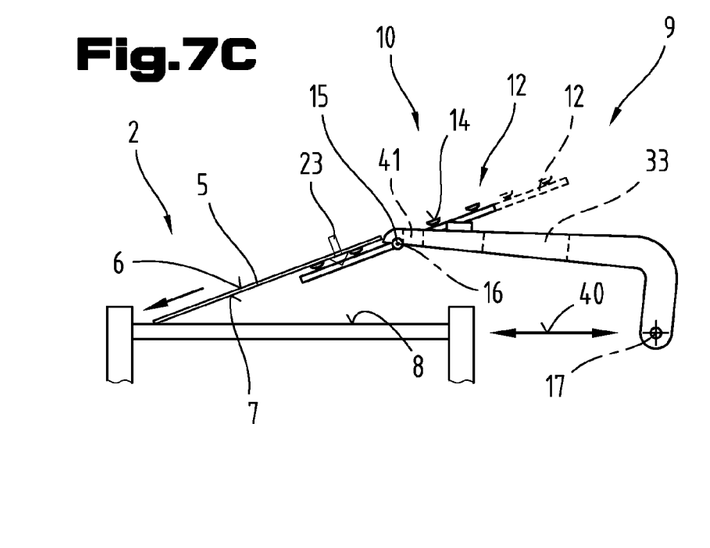
Figure 7D:
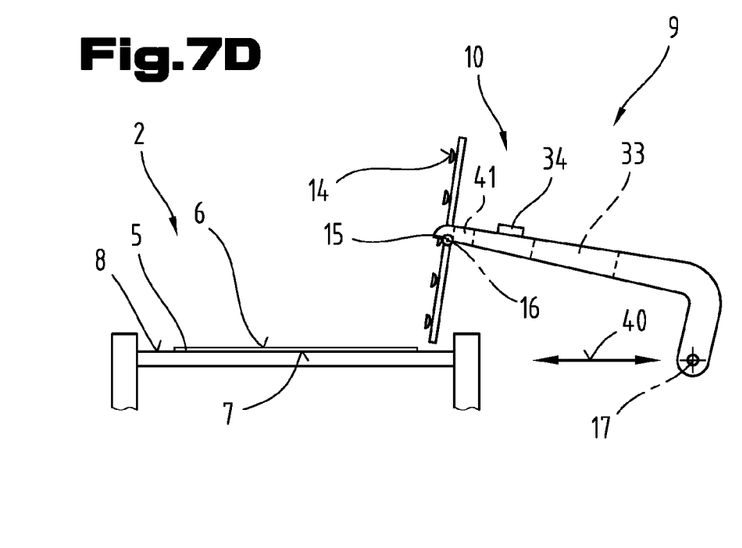

In the embodiment shown, the manipulator 10 is displaceable along the horizontal direction 40, such that it can let the workpiece 5 slide off the gripping surface 14 in the course of the turning operation. Alternatively, the manipulator 10 may also comprise a telescopic arm 33, as is indicated in dashed lines. Likewise, the gripping device 12 could also be embodied so as to be correspondingly displaceable, as is indicated in FIG. 7C.

Figure 8A:
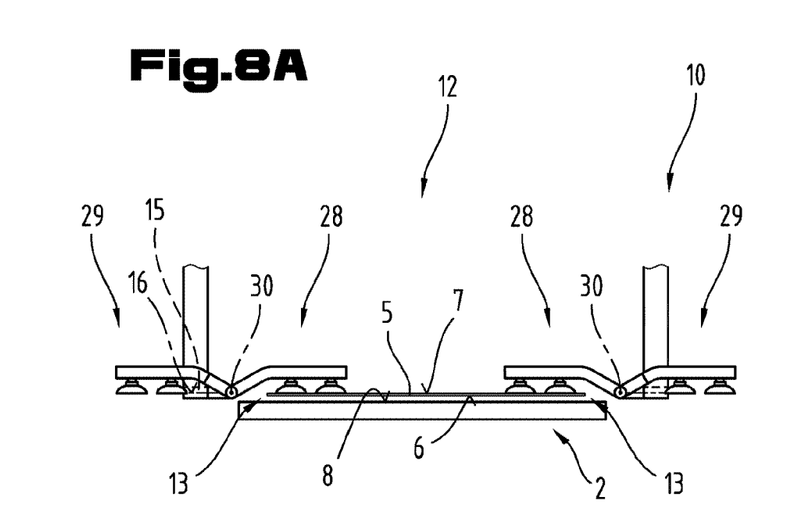
FIG. 8A to D an embodiment of a gripping device of the manipulator in a front view.
Figure 8B:
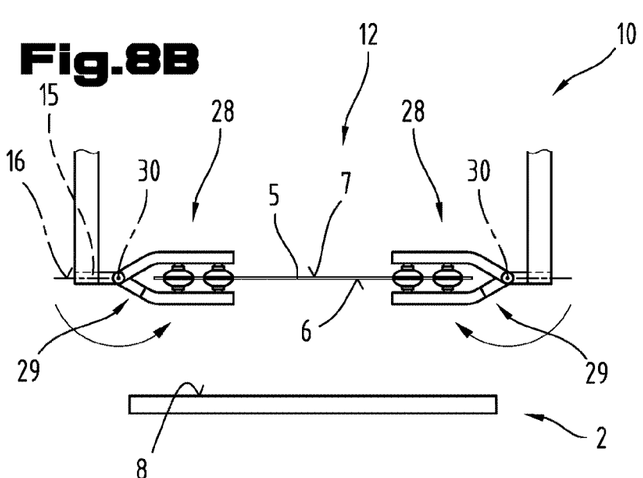
Figure 8C:
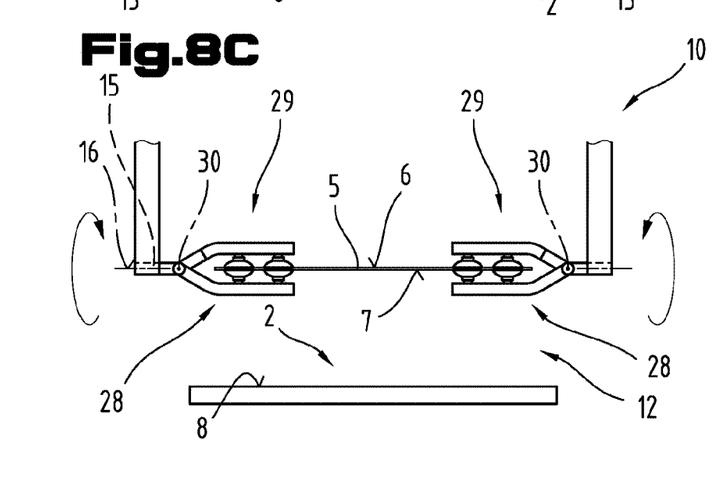
Figure 8D:
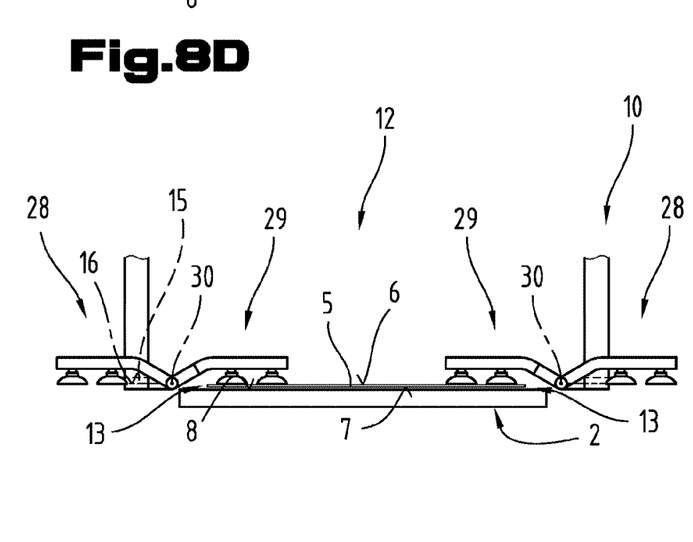

FIGS. 8A to 8D show an advantageous embodiment of a gripping device 12 of the manipulator 10 in a front view. For each of the workpiece ends 13, the gripping device 12 comprises a first gripping section 28 that can grip the top side 7 of the workpiece 5 and a second gripping section 29 that can grip the bottom side 6, both of which can be pivoted separately about a rotation axis 30. As is shown in FIG. 8A, lifting the bottom side 6 of the workpiece 5 off the receiving surface 8 of the conveying means 2 is carried out by the first gripping section 28 in that it grips the top side 7 of the workpiece 5 on the edges and lifts it, subsequently the second gripping section 29 pivots in the direction towards the bottom side 6 and grips it also on the edges.

Said gripping can, for example, be performed by grippers known from the prior art, such as magnetic grippers or suction grippers. Optionally, the two gripping sections 28, 29 can apply an additional clamping force to the workpiece 5.

Subsequently, the turning operation is performed, preferably with the aid of the turning head 15 about the turning axis 16, then the first gripping section 28 pivots about the rotation axis 30 back from the top side 7 of the workpiece 5. Subsequently, the workpiece 5 is placed on the receiving surface 8 of the conveying means 2 with its top side 7 with the aid of the second gripping section 29.

The exemplary embodiments show possible embodiment variants, and it should be noted in this respect that the invention is not restricted to these particular illustrated embodiment variants of it, but that rather also various combinations of the individual embodiment variants are possible and that this possibility of variation owing to the technical teaching provided by the present invention lies within the ability of the person skilled in the art in this technical field.

The scope of protection is determined by the claims. Nevertheless, the description and drawings are to be used for construing the claims. Individual features or feature combinations from the different exemplary embodiments shown and described may represent independent inventive solutions. The object underlying the independent inventive solutions may be gathered from the description.

Finally, as a matter of form, it should be noted that for ease of understanding of the structure, elements are partially not depicted to scale and/or are enlarged and/or are reduced in size.

| List of reference numbers | |
|---|---|
| 1 | Sheet metal processing plant |
| 2 | Conveying means |
| 3 | Conveying plane |
| 4 | Conveying direction |
| 5 | Workpiece |
| 6 | Bottom side |
| 7 | Top side |
| 8 | Receiving surface |
| 9 | Turning unit |
| 10 | Manipulator |
| 11 | Storage |
| 12 | Gripping device |
| 13 | Workpiece ends |
| 14 | Gripping surface |
| 15 | Turning head |
| 16 | Turning axis |
| 17 | Pivot axis |
| 18 | Axis |
| 19 | Tray |
| 20 | Access opening |
| 21 | First operating position |
| 22 | Second operating position |
| 23 | Holding force |
| 24 | Conveying element |
| 25 | Gripping arm |
| 26 | First gripping device |
| 27 | Second gripping device |
| 28 | First gripping section |
| 29 | Second gripping section |
| 30 | Rotation axis |
| 31 | Conveying means storage |
| 32 | Conveying drive |
| 33 | Telescopic arm |
| 34 | Means |
| 35 | Distance |

-continued

| List of reference numbers | |
|---|---|
| 36 | Length |
| 37 | Drive device |
| 38 | Actuating drive |
| 39 | Intermediate position |
| 40 | Horizontal direction |
| 41 | Turning drive |

The invention claimed is:

1. A sheet metal processing plant (1) comprising a conveying means (2), said conveying means (2) defining a receiving surface (8) for a workpiece (5) and a conveying direction (4) in a conveying plane (3) and being embodied for conveying the workpiece (5), said workpiece (5) having a bottom side (6) and a top side (7); and a turning unit (9), said turning unit (9) being embodied for turning the workpiece (5) received on the receiving surface (8) from the bottom side (6) to the top side (7);

wherein the turning unit (9) comprises a manipulator (10), said manipulator (10) being embodied to lift the bottom side (6) of the workpiece (5) off the receiving surface (8), to perform a turning operation of the workpiece (5) and to place the top side (7) of the workpiece (5) on the receiving surface (8) of the conveying means (2);

wherein the manipulator (10) comprises a first gripping device (26) and a second gripping device (27) embodied to transfer the workpiece (5) from the first gripping device (26) to the second gripping device (27) during the turning operation; and wherein the second gripping device (27) is embodied to place the top side (7) of the workpiece (5) on the receiving surface (8) of the conveying means (2).

2. The sheet metal processing plant (1) according to claim 1, wherein at least parts of the conveying means (2) are embodied to be displaceable such that in the conveying plane (3), an access opening (20) for the manipulator (10) can be formed.

3. The sheet metal processing plant (1) according to claim 1, wherein the manipulator (10) comprises a gripping device (12), said gripping device (12) being embodied to grip the workpiece (5) on the top side (7) with a gripping surface (14).

4. The sheet metal processing plant (1) according to claim 1, wherein the manipulator (10) comprises a gripping device (12) which is embodied to grip the workpiece (5) on the edges of two opposite workpiece ends (13).

5. The sheet metal processing plant (1) according to claim 3, wherein the gripping device (12) comprises at least one turning head (15), said turning head (15) being embodied to be pivotable at least by 180°.

6. The sheet metal processing plant (1) according to claim 1, wherein the manipulator (10) is embodied being pivotable about a pivot axis (17), said pivot axis (17) being arranged in parallel with respect to the conveying direction (4).

7. The sheet metal processing plant (1) according to claim 1, wherein the manipulator (10) is embodied being pivotable about an axis (18), said axis (18) being arranged in parallel with respect to the conveying plane (3) and orthogonally with respect to the conveying direction (4).

8. A method for turning metal sheets for the sheet metal processing plant (1) according to claim 1, comprising the following steps providing a sheet metal processing plant (1);

providing a conveying means (2), said conveying means (2) defining a receiving surface (8) for a workpiece (5) and a conveying direction (4) in a conveying plane (3) and being embodied for conveying a workpiece (5), said workpiece (5) having a bottom side (6) and a top side (7);

providing a workpiece (5) on the receiving surface (8) of the conveying means (2); and providing a turning unit (9), said turning unit (9) being embodied to turn the workpiece (5) received on the receiving surface (8) from the bottom side (6) to the top side (7);

wherein the turning unit (9) comprises a manipulator (10) which manipulator (10) lifts the bottom side (6) of the workpiece (5) off the receiving surface (8), carries out a turning operation of the workpiece (5) and places the top side (7) of the workpiece (5) on the receiving surface (8) of the conveying means (2);

wherein the manipulator (10) comprises a first gripping device (26) and a second gripping device (27); and wherein by means of the first gripping device (26), the bottom side (6) of the workpiece (5) is lifted off the receiving surface (8) and a first partial step of the turning operation is performed, the workpiece (5) is transferred from the first gripping device (26) to the second gripping device (27) and received by it, a second partial step of the turning operation is performed and the top side (7) of the workpiece (5) is placed on the receiving surface (8) of the conveying means (2) by means of the second gripping device (27).

9. The method according to claim 8, wherein a storage (11) is provided, which is positioned below the conveying plane (3) of the conveying means (2).

10. The method according to claim 8, wherein in the conveying means (2), an access opening (20) for the manipulator (10) is formed in the conveying plane (3), and, in this regard, at least parts of the conveying means (2) are displaced.

11. The method according to claim 9, wherein providing the workpiece (5) is carried out by means of the manipulator (10), wherein the workpiece (5) is lifted off the storage (11) and is placed on the receiving surface (8) of the conveying means (2) by means of the manipulator (10).

12. The method according to claim 8, wherein the manipulator (10) comprises a gripping device (12) with a gripping surface (14) and the workpiece (5) is gripped on the top side (7) with the gripping surface (14).

13. The method according to claim 8, wherein the manipulator (10) comprises a gripping device (12), and the workpiece (5) is gripped on the edges of two opposite workpiece ends (13) by the gripping device (12).

14. The method according to claim 12, wherein the gripping device (12) comprises at least one turning head (15), which is embodied to be pivotable by at least 180° and the gripping device (12) is turned at least partially about a turning axis (16) with the workpiece (5) in the turning operation.

15. The method according to claim 8, wherein the manipulator (10) further comprises means (34) by which a holding force (23) of the gripping device (12) is at least reduced during the turning operation and wherein when the holding force (23) is reduced, the workpiece (5) slides off the gripping device (12) when it is placed on the receiving surface (8) of the conveying means (2).

\* \* \* \* \*